United States Patent [19]

Hwang

[11] Patent Number: 5,714,873
[45] Date of Patent: Feb. 3, 1998

[54] POWER SUPPLY FOR AUTOMATICALLY SUPPLYING A PROPER VOLTAGE TO A CENTRAL PROCESSING UNIT

[75] Inventor: Hae-Jin Hwang, Suwon-si, Rep. of Korea

[73] Assignee: Samsung Electronics Co., Ltd., Suwon, Rep. of Korea

[21] Appl. No.: 770,173

[22] Filed: Dec. 19, 1996

[30] Foreign Application Priority Data

Dec. 20, 1995 [KR] Rep. of Korea ............ 95-52855

[51] Int. Cl.[6] ........................... G06F 1/02
[52] U.S. Cl. ........................... 323/273
[58] Field of Search ............ 365/226, 189.01, 365/228–229; 235/492; 395/550; 307/24–28; 340/825.08

[56] References Cited

U.S. PATENT DOCUMENTS

| | | | |
|---|---|---|---|
| 4,992,970 | 2/1991 | Igarashi | 364/900 |
| 5,019,996 | 5/1991 | Lee | 364/483 |
| 5,086,501 | 2/1992 | LeLuca et al. | 395/550 |
| 5,325,074 | 6/1994 | Suenaga | 331/46 |
| 5,375,247 | 12/1994 | Hueser | 395/750 |
| 5,481,730 | 1/1996 | Brown et al. | 395/750 |
| 5,490,117 | 2/1996 | Oda et al. | 365/226 |
| 5,493,683 | 2/1996 | Cloud et al. | 395/750 |
| 5,568,607 | 10/1996 | Ishikawa et al. | 395/182.2 |

*Primary Examiner*—Aditya Krishnan
*Attorney, Agent, or Firm*—Robert E. Bushnell, Esq.

[57] ABSTRACT

A power supply for automatically supplying a proper voltage to a central processing unit, includes: a voltage detecting pin of the central processing unit for outputting an operating voltage indicating signal; a selector for causing corresponding operating voltage to be inputted to the central processing unit by sensing the voltage detecting pin state outputted by the central processing unit; a power supply which supplies a proper voltage to the central processing unit; and a controller which outputs a control signal so as to supply the proper operating voltage to the central processing unit by determining the type of the central processing unit.

26 Claims, 7 Drawing Sheets

POWER SUPPLY FOR AUTOMATICALLY SUPPLYING A PROPER VOLTAGE TO A CENTRAL PROCESSING UNIT

CLAIM OF PRIORITY

This application make reference to, incorporates the same herein, and claims all benefits accruing under 35 U.S.C §119 from an application entitled *A Power Supply For Automatically Supplying Various Voltages Corresponding To A Type Of A Central Processing Unit, And Power Supply Method,* earlier filed in the Korean Industrial Property Office on the 20$^{th}$ day of December 1995, and there assigned Ser. No. 52855/1995.

BACKGROUND OF THE INVENTION

1. Field of the Invention

The present invention relates generally to automatic supply of a proper voltage to a central processing unit (CPU), after identifying the type of central processing unit from among a group of central processing units having different required operational voltages.

2. Description of the Related Art

Presently, a central processing unit (CPU) having an operating voltage five volts has been used, but now, the various operating voltage according to the type of central processing unit, are being used in order to use the high operating frequency.

Particularly, the central processing unit of 3.3V is classified as a STD class operating between 3.135V and 3.465V, VR class operating between 3.3V and 3.465V, and VRE class operating between 3.45V and 3.6V in order to use a higher operating frequency. One earlier power supply for supplying power to a central processing unit utilized the state of a voltage detecting pin of the central processing unit to control the voltage supplied to the central processing unit. However, this earlier technique only provided for two different voltages to the central processing unit, namely, one voltage when the voltage detecting pin was in a high logic state and another voltage when the pin was in a low logic state.

Alternatively, another earlier power supply for a central processing unit utilized a jumper arrangement in which a resistor was manually selected by a user using jumper wires to determine the output voltage provided to the CPU. This resulted in difficulties in that manual procedures are costly and error prone. Another exemplar, Oda, U.S. Pat. No. 5,490,117, entitled *IC Card With Dual Level Power Supply Interface And Method For Operating The IC Card,* endeavors to use an IC card which is arranged to operate with both a 3.3V and a 5V power supply. Oda '117 however, is directed to controlling the voltage at an entire IC card rather than controlling a voltage supplied to a central processing unit as in the present invention.

The following additional patents also disclose features in common with the present invention but nevertheless do not disclose all of the recited features thereof.

U.S. Pat. No. 5,568,607 to Ishikawa, et al., entitled *Apparatus, System And Method For Controlling Power Consumption In A Selectively Enabled Processing System.*

U.S. Pat. No. 5,493,683 to Cloud, et al., entitled *Register For Identifying Processor characteristics.*

U.S. Pat. No. 5,481,730 to Brown, et al., entitled *Monitoring And Control Of Power Supply Functions Using A Microcontroller.*

U.S. Pat. No. 5,375,247 to Huester, entitled *Apparatus For Controlled Switching Of A Microcomputer To Standby Mode.*

U.S. Pat. No. 5,325,074 to Suenaga, entitled *Oscillator With Supply Voltage Changeover According To Activated And Disabled States Of A Microcomputer.*

U.S. Pat. No. 5,086,501 to LeLuca, et al., entitled *Computer system With Selective Operating Voltage And Bus Speed.*

U.S. Pat. No. 5,019,996 to Lee, entitled *Programmable Power Supply Level Detection And Initialization Circuitry.*

U.S. Pat. No. 4,992,970 to Igarashi, entitled *System For Reading Or Setting Printed Circuit Boards Voltage Of Computer By Support Processor.*

SUMMARY OF THE INVENTION

It is an object of the present invention to provide an improved power supply device and process for a central processing unit.

It is another object to provide a device and method for automatically supplying a proper voltage to a central processing unit (CPU) after identifying the type of central processing unit from among a group of CPU's having different required voltages.

To achieve these and other objects, the present invention contemplates a central processing unit (CPU) which performs data processing and controls the input and output of a computer; a power supply generator for supplying power in order to input a corresponding power to the central processing unit; and a controller for outputting a control signal to the power supply generator so as to supply a proper operating voltage to the central processing unit being used by identifying the type of central processing unit.

In another aspect of the present invention, the device for automatically supplying a proper voltage to a central processing unit (CPU) includes a central processing unit which has a voltage detecting pin for outputting an operating voltage indicating signal; a selection means for causing a corresponding operating voltage to be inputted to a central processing unit being used by sensing the voltage detecting pin state outputted from the central processing unit; a power supply generator which supplies power in order to input a corresponding voltage to the central processing unit; and a controller which outputs a control signal so as to supply a corresponding operating voltage to the central processing unit by determining a type of the central processing unit.

To achieve the above object, the present invention contemplates supplying a first voltage to the central processing unit if a detected voltage detecting pin state of a voltage detecting pin of the central processing unit is in a high-state after taming a computer system on; supplying a second voltage and determining the type of central processing unit when the voltage detecting pin state is at a low state; and supplying a corresponding operating voltage to the central processing unit according to the determined type of central processing unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will become apparent from a study of the following detailed description with reference to the accompanying drawings. A description of the power supply for supplying power to a 486 type central processing unit having an operating voltage of 5V and an operating voltage of 3.45V according to the kind of central processing unit is as follows with reference to the accompanying FIGS. 1 and 2.

Figure 1:
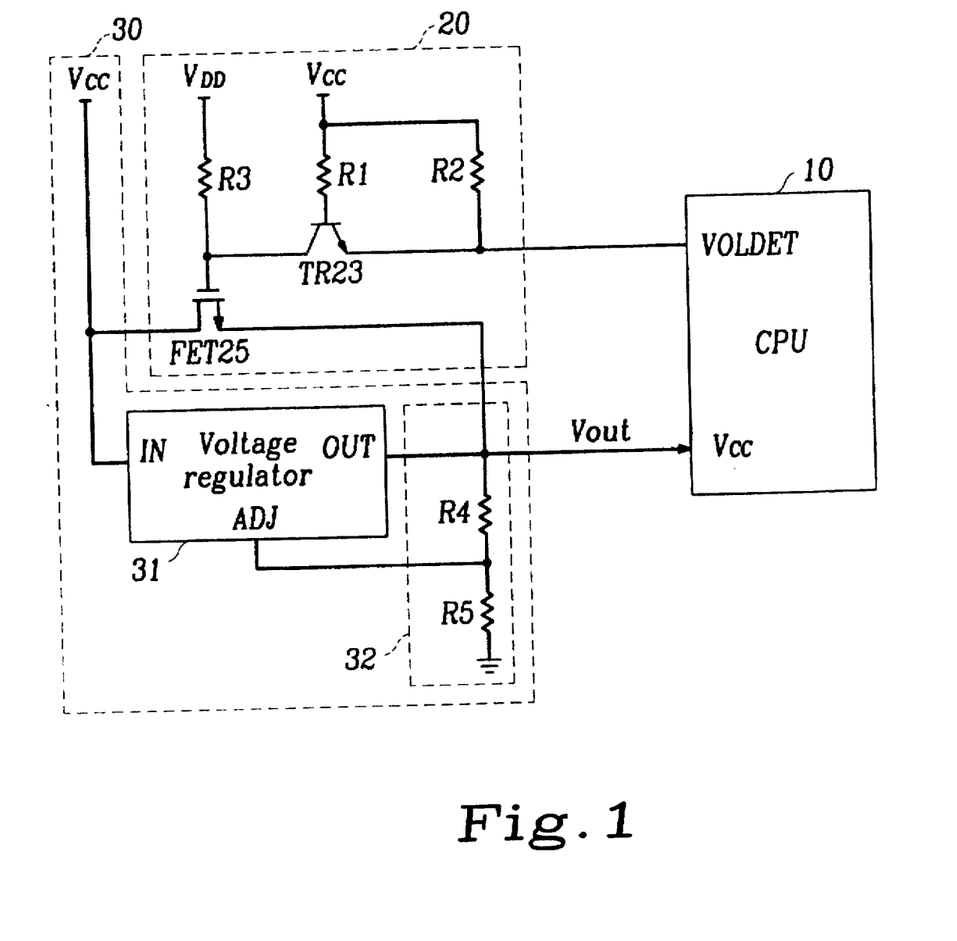
FIG. 1 is a block diagram of an earlier power supply for supplying power to the central processing unit by using a voltage detecting pin of the central processing unit.

As shown in FIG. 1, the power supply for supplying power to the 486 central processing unit includes: a central processing unit 10 having the voltage detecting pin VOLDET which outputs a signal indicating an operating voltage; a selection means 20 which helps the operating voltage to be inputted to the central processing unit 10 by sensing a state of the voltage detecting pin VOLDET from the central processing unit 10; and a power supply 30 which supplies power to the central processing unit 10.

The selection means 20 includes a first resistor R1 having one terminal which is connected to a power source $V_{CC}$; a first transistor TR23 having a base which is connected to the other terminal of the first resistor R1 and having an emitter which is connected to the central processing unit 10; a second resistor R2 having one terminal which is connected to the power source $V_{CC}$ and having the other terminal connected to the emitter of the first transistor TR23; a third resistor R3 having one terminal is which is connected to a power $V_{DD}$ and having the other terminal connected to a collector of the first transistor TR23; and a field effect transistor FET25 having a gate which is connected to the collector of the second transistor TR23, a drain which is connected to the power supply 30 and a source which is connected to the central processing unit 10.

The power supply 30 includes a voltage regulator 31 which maintains a constant output voltage regardless of the change of input and output load, and a voltage division means 32 which divides the voltage of the voltage regulator 31 so that an output voltage of the voltage regulator 31 may be maintained at 3.45V. The voltage division means 32 includes a fourth resistor R4 having one terminal which is connected to an output port OUT of the voltage regulator 31 and having the other terminal connected to an adjusting port ADJ, and a fifth resistor R5 having one terminal which is connected to the fourth resistor R4 and having the other terminal grounded.

Figure 2:
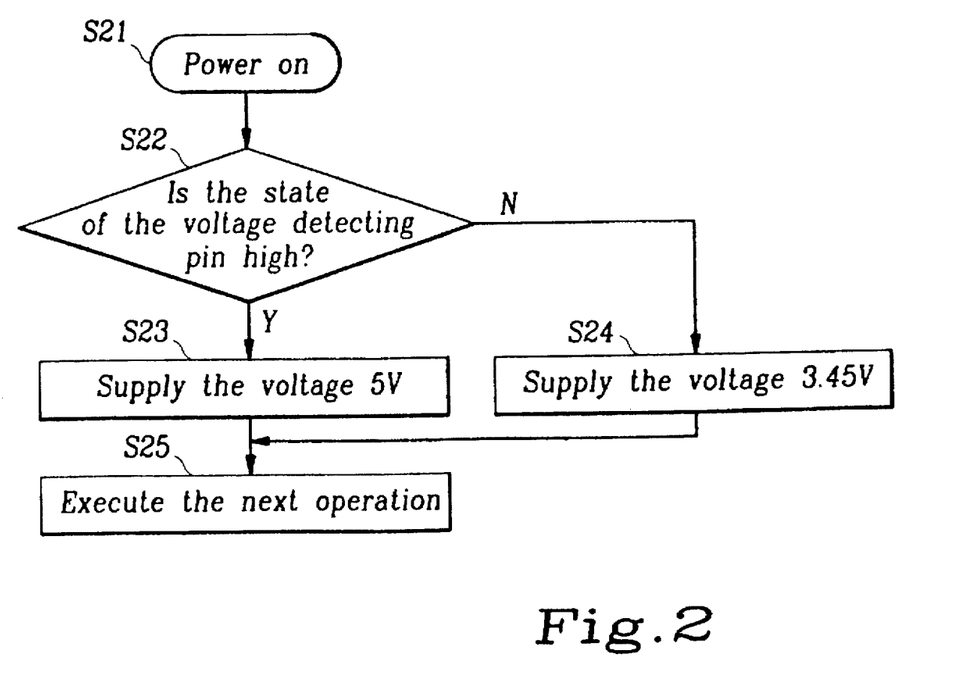
FIG. 2 is a flowchart of the power supply for supplying power to the central processing unit by using the voltage detecting pin of the central processing unit of FIG. 1.

The operation of the earlier power supply for supplying power to the 486 central processing unit having two operating voltages is as follows. First, power of a computer system turns on (S21). If a voltage detecting pin VOLDET state of the central processing unit 10 is high, the first transistor TR23 of the selection means 20 is placed in an off-state (S22). When the first transistor TR23 is in an off-state, the gate of the field effect transistor FET25 is in an on-state and the power $V_{CC}$ supplied to the drain supplies the operating voltage 5V to the central processing unit 10 through the source thereof (S23).

The voltage of 3.3V from an output port OUT of the voltage regulator 31 is meaningless because the voltage 5V is outputted from the field effect transistor FET25 connected to the output port OUT. If the voltage detecting pin VOLDET state of the central processing unit 10 is in a low-state, the first transistor TR23 of the selection means 20 is placed in an on-state (S21). When the 13 first transistor TR23 is in an on-state, the gate of the field effect transistor FET25 of the power supply 30 is in an off-state and the power $V_{CC}$ supplied to the drain thereof is not supplied to the central processing unit 10 from the source. At this time, the voltage of 3.45V from the output port OUT of the voltage regulator 31 is supplied to the central processing unit 10 (S24 and S25). Voltage regulator 31 is able to adjust the voltage based on the following equation:

$$V_{out}=V_{ref}*(1+R_y/R_x)+(I_{adj}*R_y)$$

$$(R_x=R4, R_y=R5)$$

Figure 3:
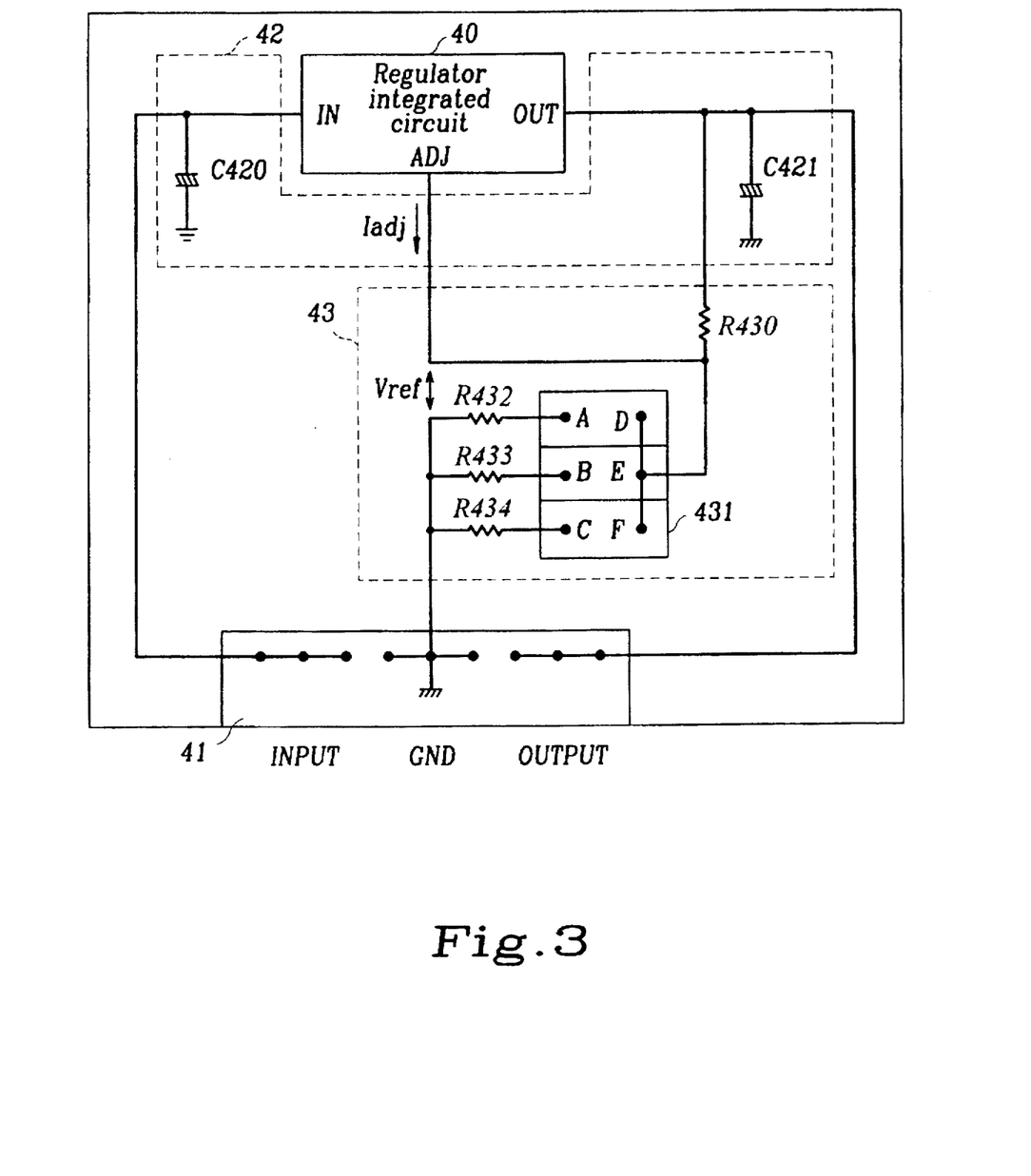
FIG. 3 is a block diagram of an earlier power supply for supplying power to the central processing unit by using a jumper port.

Second, the description of the power supply for supplying power to the central processing unit having various operating voltages of a 3.3V class according to the kind of central processing unit is as follows with reference to the accompanying FIG. 3. As shown in FIG. 3, the power supply for supplying power to the central processing unit by using the jumper port includes: a voltage regulator 40 which maintains a constant output voltage regardless of the change of input and output load; an input/output connector 41 which supplies an input voltage to the voltage regulator 40 and supplies an output voltage of the voltage regulator 40 to the central processing unit 10; a smoothing circuit 42 which stabilizes the input voltage and the output voltage of the voltage regulator 40; and a voltage division means 43 which divides the output voltage of the voltage regulator 40 according to the type of central processing used.

The smoothing circuit 42 uses a first capacitor C420 having one terminal which is connected to an input connecting point of the input/output connector 41 and the voltage regulator 40 and having the other terminal grounded, and which supplies a stable input voltage to the input port IN of the voltage regulator 40; and a second capacitor C421 having one terminal which is connected to the output port OUT of the voltage regulator 40 and having the other terminal which is grounded, and which stabilizes an output voltage.

The voltage division means 43 has a first resistor R430 having one terminal which is connected to the second capacitor C421 and having the other terminal connected to the adjusting port ADJ of the voltage regulator 40; a connector 431 which divides an output voltage by connecting a first port D, a third port E, and a fifth port F to the first resistor R430; a second resistor R432 having one terminal which is connected to the second port A of the connector 431 and having the other terminal connected to the ground port GND of the input/output connector 41; a third resistor R433 having one terminal which is connected to the fourth port B of the connector 431 and having the other terminal connected to the ground port GND of the input/output connector 41; and a fourth resistor R434 having one terminal which is connected to the sixth port C of the connector 431 and the other terminal connected to the ground port GND of the input/output connector 41.

The operation of the power supply for supplying the power to the central processing unit by using the jumper port is as follows. First, the user selects the resistor output the voltage to fit the central processing unit as the jumper from among division resistors R432, R433, and R434 of the voltage division means 43 and connects it to the first resistor R430. If the voltage of 5V is inputted to an input port INPUT of the input/output connector 41, the voltage of 5V stabilized by the first capacitor C420 is inputted to an input port IN of the voltage regulator 40.

A selected voltage according to a resistor connected to the first resistor R430 by the jumper is output through the output port OUT of the voltage regulator 40. The voltage from the voltage regulator 40 is smoothed by the second capacitor C421, and a more stable direct output voltage is outputted to the output port OUTPUT of the input/output connector 41 and is inputted to a power input port of the central processing unit.

The cost of the power supply increases because of using a voltage regulator module, and the user selects the operating voltage of the central processing unit with a special jumper, so that the power supply is troublesome. In addition, an error is produced or the central processing unit is damaged when a wrong jumper is selected.

Figure 4:
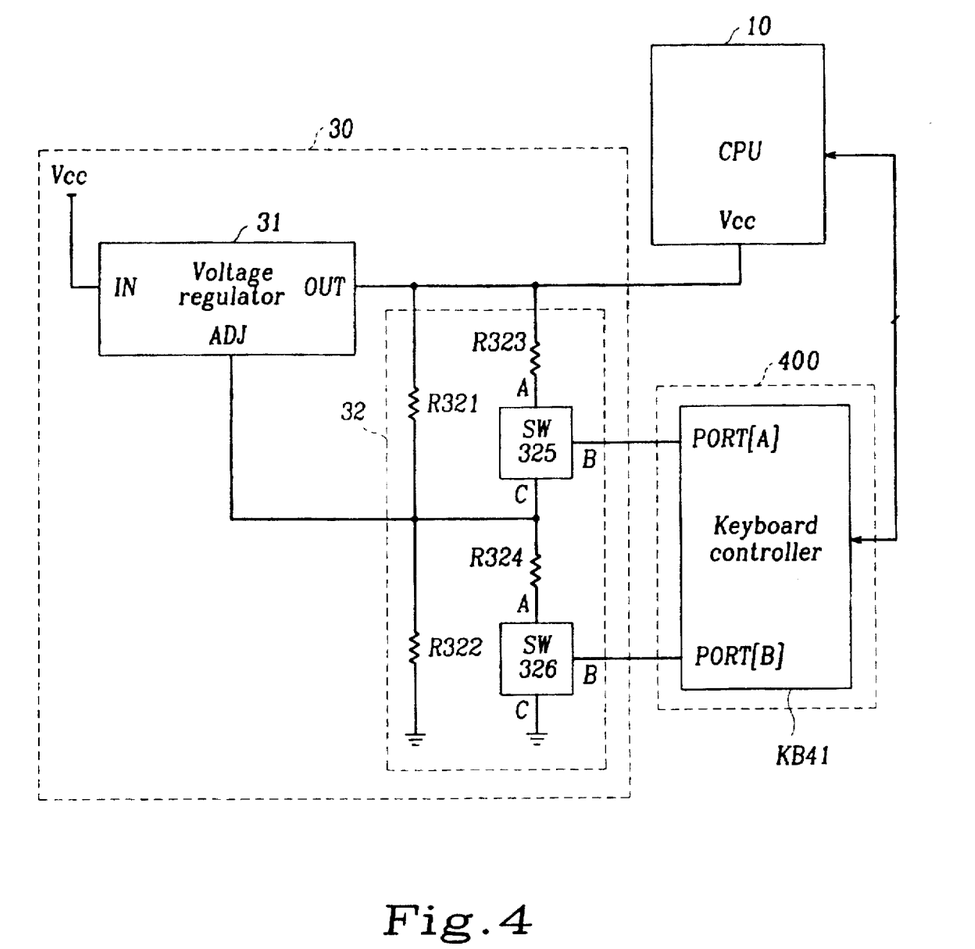
FIG. 4 is a block diagram of a device for automatically supplying a proper voltage to a central processing unit in accordance with a preferred embodiment of the present invention.

As shown in FIG. 4, a power supply for automatically supplying various voltages corresponding to a type of a central processing unit in accordance with a preferred embodiment of the present invention may be fabricated with a central processing unit 10 which performs data processing and controls the input and output; a power supply 30 which supplies power to the central processing unit 10; and a controller 400 which outputs a control signal to the power supply 30 so as to supply a proper operating voltage to a central processing unit 10 being used by determining the type of the central processing unit 10.

Figure 5:
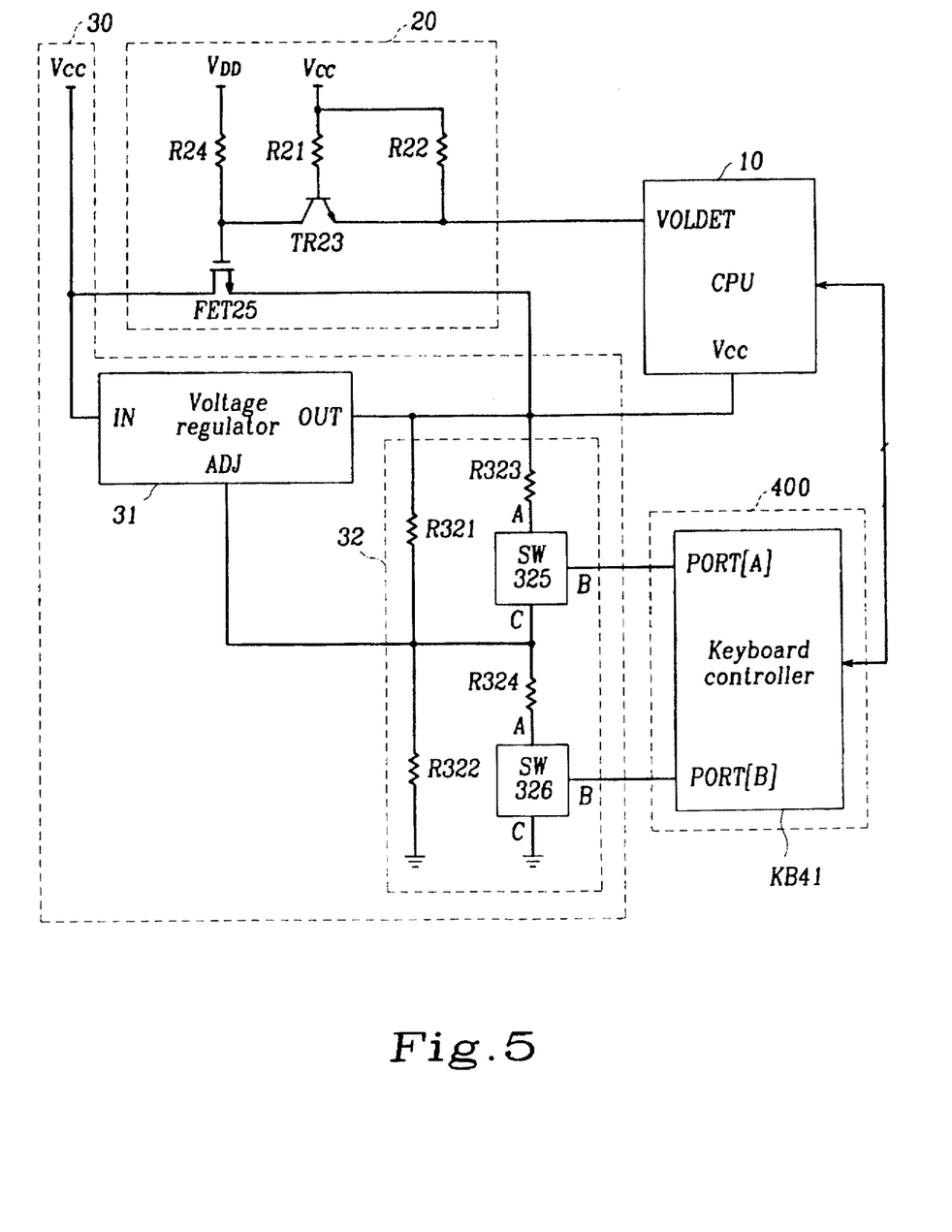
FIG. 5 is block diagram of another power supply constructed in accordance with the principles of the present invention.

As shown in FIG. 5, a power supply for automatically supplying a proper voltage to a central processing unit in accordance with a preferred embodiment of the present invention includes: a central processing unit 10 which performs data processing and controls the input and output, and has a voltage detecting pin VOLDET for outputting an operating voltage indicating signal; a selection means 20 which causes the operating voltage to be inputted to the central processing unit being used 10 by sensing a state of the voltage detecting pin VOLDET voltage from the central processing unit 10; a power supply 30 which supplies power to the central processing unit 10; and a controller 400 which outputs a control signal to the power supply 30 so as to supply proper operating voltage to the central processing unit 10 by determining the type of the central processing unit 10.

The selection means 20 includes: a first resistor R21 having one terminal which is connected to a power source $V_{CC}$; a first transistor TR23 having a base which is connected to the other terminal of the first resistor R21 and having an emitter connected to the central processing unit 10; a second resistor R22 having one terminal which is connected to the power source $V_{CC}$ and having the other terminal connected to the emitter of the first transistor TR23; a third resistor R24 having one terminal which is connected to a power source $V_{DD}$ and having the other terminal connected to a collector of the first transistor TR23; and a field effect transistor FET25 having a gate which is connected to the collector of the second transistor TR23, a drain connected to the power supply 30 and a source connected to the central processing unit 10.

The power supply 30 includes: a voltage regulator 31 which maintains a constant output voltage regardless of the change of input and output load; and a voltage division means 32 which divides an output voltage of the voltage regulator 31 so as to fit to the operating voltage of the central processing unit 10 being used. The controller 400 includes a keyboard controller KB41 which is connected to the central processing unit 10 and outputs a corresponding signal to the power supply 30 by distinguishing the operating voltage of the central processing unit 10.

The voltage division means 32 may be constructed with a fourth resistor R321 having one terminal which is connected to an output port OUT of the voltage regulator 31 and having the other terminal connected to an adjusting port ADJ of the voltage regulator 31; a fifth resistor R322 having one terminal which is connected to the fourth resistor R321 and having the other terminal grounded; a sixth resistor R323 having one terminal which is connected to the output port OUT of the voltage regulator 31; a first switch SW325 having a first port A which is connected to the other terminal of the sixth resistor R323, a second port B connected to an output PORT[A] of the keyboard controller KB41, and a third port C connected to one terminal of the fifth resistor R322; a seventh resistor R324 having one terminal which is connected to the third port C of the first switch SW325; and a second switch SW326 having a first port A which is connected to the other terminal of the seventh resistor R324, a second port B connected to an output PORT[B] of the keyboard controller KB41, and a third port C which is grounded. The controller 400 is not limited to the keyboard controller KB41.

The operation of a power supply for automatically supplying a proper voltage corresponding to a central processing unit (CPU) in accordance with a preferred embodiment of the present invention is as follows. First, the operation of a power supply for automatically supplying a proper voltage to a central processing unit (CPU) as shown in FIG. 4 is as follows. The voltage regulator 31 for receiving the voltage $V_{CC}$ through the input port IN, outputs the voltage determined by the fourth and the fifth resistors R321 and R322 in an initial off-state of the fast and the second switches SW325 and SW326.

Hereafter, the computer system determines the type of the central processing unit 10, executing a self-test procedure when turning the power on. If the type of the central processing unit 10 is the type requiring the initial setting output voltage, the initial setting supply voltage is continuously supplied to the central processing unit 10. However, if a type of central processing unit 10 having another operating voltage is mounted, the keyboard controller KB41 of the controller 400 receives data of the type of the central processing unit 10 being operated. Keyboard controller KB41 outputs a control signal to the voltage division means 32 of the power supply 30 through a corresponding output port so as to supply the operating voltage to fit the type of the central processing unit 10.

At this time, the switch receiving the signal outputted from the output port of the keyboard controller KB41 between the first and the second switches SW325 and SW326 of the voltage division means 32 is in an on-state. If the first switch SW325 is in an on-state, the sixth resistor R323 connected to the first port A is connected to the fourth resistor R321 in parallel, and if the second switch SW326 is in an on-state, the seventh resistor R324 connected to the first port A is connected to the fifth resistor R322 in parallel. So, the initial voltage outputted from the voltage regulator 31 is charged. Since the sixth and the seventh resistor R323 and R324 are set so that the charged output voltage fits the type of the central processing unit 10, the power supply 30 supplies the operating voltage to fit to the type of the central processing unit 10. When only the first switch SW325 is in an on-state, an output voltage is calculated by $$V_{out}=V_{ref}*(1+R_y/R_x//R_z)+(I_{adj}*R_y)$$

$$(R_x=R321, R_y=R322, R_z=R323).$$

When only the second switch SW326 is in an on-state, an output voltage is calculated by $$V_{out}=V_{ref}*(1+R_y//R_w/R_x)+(I_{adj}*(R_y//R_w))$$

$$(R_x=R321, R_y=R322, R_w=R324).$$

Figure 7:
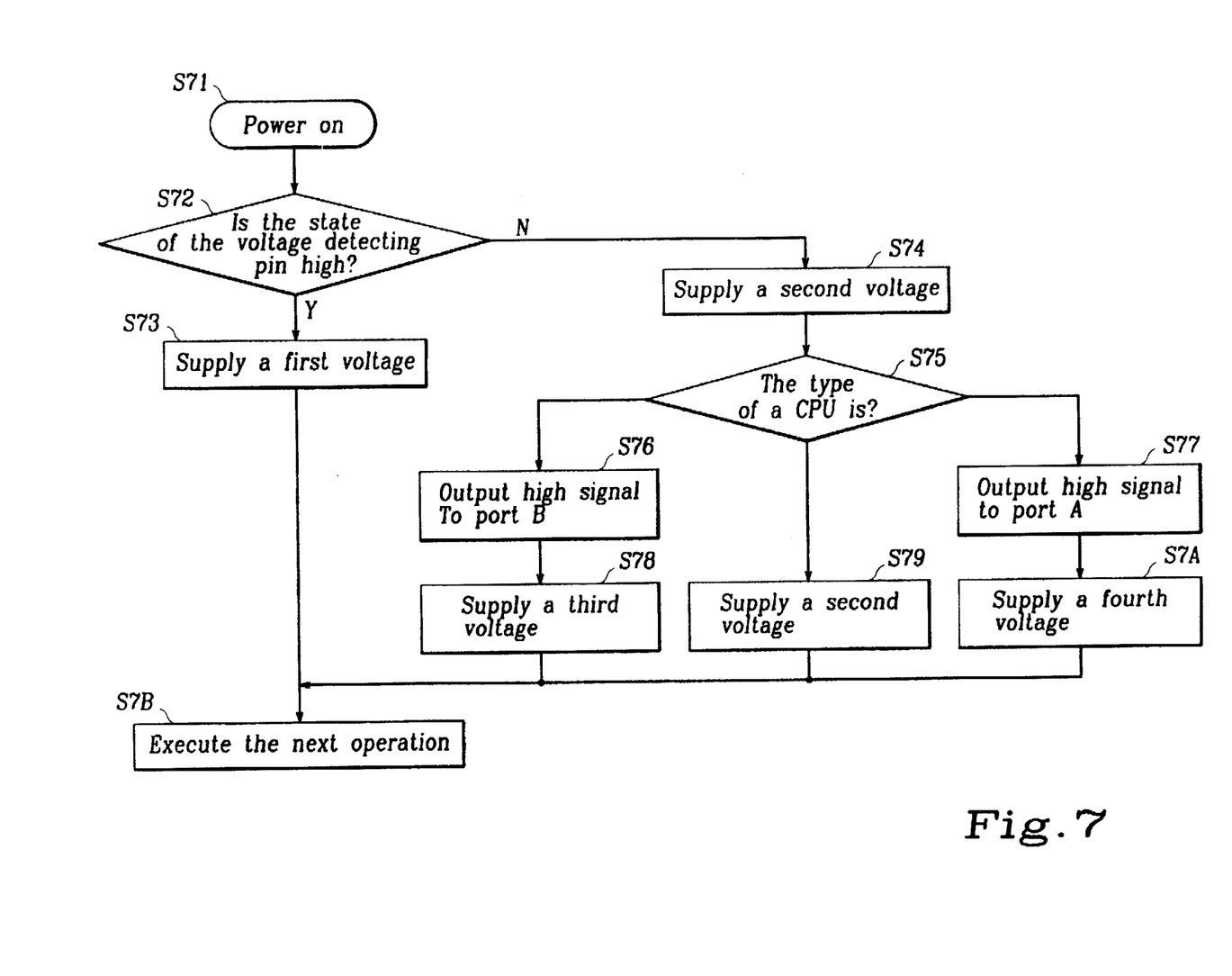
FIG. 7 is a flowchart of a method for automatically supplying a proper voltage to a central processing unit (CPU) constructed in accordance with the principles of the present invention.

Secondly, the operation of a power supply for automatically supplying a proper voltage to a central processing unit (CPU) as shown in FIG. 5 is as follows. The power supply 30 supplies the power to the computer system, when the power is supplied under the condition that the central processing unit 10 having a voltage detecting pin is mounted in the computer system (S71). If the voltage detecting pin VOLDET state of the central processing unit 10 is in an on-state, the first transistor TR23 of the selection means 20 is to in an off-state (S72).

When the first transistor TR23 is in an off-state, the gate of the field effect transistor FET25 is in an on-state due to the voltage $V_{DD}$. Then, the voltage $V_{CC}$ supplied to the drain supplies the operating voltage of the first voltage to the central processing unit 10 through the source, and the computer system executes the next operation (S73–S7B). Since the first voltage outputted from the field effect transistor FET25 is a high voltage, the second voltage outputted from an output port OUT of the voltage regulator 31 is meaningless. However, if the voltage detecting pin VOLDET state of the central processing unit 10 is in a low-state, the first transistor TR23 of the selection means 20 is in an on-state (S72).

When the first transistor TR23 is in an on-state, the gate of the field effect transistor FET25 is in an off-state. Then, the voltage $V_{CC}$ supplied to the drain is not supplied to the central processing unit 10 through the source. The voltage regulator 31 receiving the power $V_{CC}$ through the input port IN outputs the second voltage determined from the fourth and the fifth resistors R321 and R322 by an initial state of an off-state of the first and the second switches SW325 and SW326 (S74).

Hereafter, the computer system determines the type of the central processing unit 10, executing a self-test procedure when mining the power on (S75). If the type of the central processing unit 10 is that which requires an initial setting output voltage, the second voltage is continuously supplied (S79). However, if the central processing unit 10 having another operating voltage is mounted, the keyboard controller KB41 of the controller 400 receiving data of the type of the central processing unit 10 operates.

The keyboard controller KB41 outputs a control signal to the voltage division means 32 of the power supply device 30 through a corresponding output port so that the power supply 30 supplies the operating voltage to fit the type of the central processing unit 10 (S76–S77). At this time, the switch receiving the signal outputted from the output port of the keyboard controller KB41 between the first and the second switches SW325 and SW326 of the voltage division means 32 is in an on-state. If the first switch SW325 is in an on-state, the sixth resistor R323 connected to the first port A is connected to the fourth resistor R321 in parallel, and if the second switch SW326 is in an on-state, the seventh resistor R324 connected to the first port A is connected to the fifth resistor R322 in parallel. So, the second voltage outputted from the voltage regulator 31 is converted and is output.

Since the sixth and the seventh resistor R323 and R324 are set so that the converted output voltage fits the type of the central processing unit 10, the power supply 30 supplies the operating voltage to fit the type of the central processing unit 10. For example, when the voltage detecting pin VOLDET state of the central processing unit 10 is in a low-state, the initial voltage outputted from the voltage regulator 31 is 3.4V as the second voltage, and the operating voltage of the central processing unit 10 is 3.3V as the third voltage, the description of the operation is as follows. The computer system is turned on (S71). Since the voltage detecting pin VOLDET state of the central processing unit 10 is in a low-state, the first transistor TR23 of the selection means 20 is in an on-state (S72).

When the first transistor TR23 is in an on-state, the gate of the field effect transistor FET25 is in an off-state due to the voltage $V_{DD}$. Then, the voltage $V_{CC}$ supplied to the drain is not supplied to the central processing unit 10 through the source. Since the first voltage outputted from the field effect transistor FET25 is a high voltage, the second voltage outputted from an output port OUT of the voltage regulator 31 is meaningless. However, if the voltage detecting pin VOLDET state of the central processing unit 10 is in a low-state, the first transistor TR23 of the selection means 20 is in an on-state (S72).

When the first transistor TR23 is in an on-state, the gate of the field effect transistor FET25 is in an off-state. Then, the power $V_{CC}$ supplied to the drain is not supplied to the central processing unit 10 through the source. The voltage regulator 31 receiving the voltage $V_{CC}$ through the input port IN outputs the second voltage 3.4V determined from the fourth and the fifth resistors R321 and R322 by an initial state of an off-state of the first and the second switches SW325 and SW326 (S74).

Hereafter, the computer system determines the type of the central processing unit 10, executing a self-test procedure when the power of the computer is mined on (S75). Since the central processing unit 10 having the third voltage 3.3V as the operating voltage is mounted, the keyboard controller KB41 of the controller 400 receiving data of the type of the central processing unit 10 operates. The keyboard controller KB41 outputs a control signal to the voltage division means 32 of the power supply 30 through the output PORT[B] so that the power supply 30 supplies the operating voltage 3.3V to fit the type of the central processing unit 10 (S76).

At this time, the switch SW326 receives the signal outputted from the output PORT[B] of the keyboard controller KB41. If the second switch SW326 is in an on-state, the seventh resistor R324 connected to the first port A is grounded. So, the voltage outputted from the voltage regulator 31 is converted to a third voltage of the operating voltage 3.3V of the central processing unit 10 and it is outputted. The power supply 30 then supplies the operating voltage to fit to the type of the central processing unit 10 (S78). Since the sixth and the seventh resistors R323 and R324 are set so that the converted output voltage fits the type of the central processing unit 10, the power supply 30 supplies the operating voltage to fit the type of the central processing unit 10.

Figure 6:
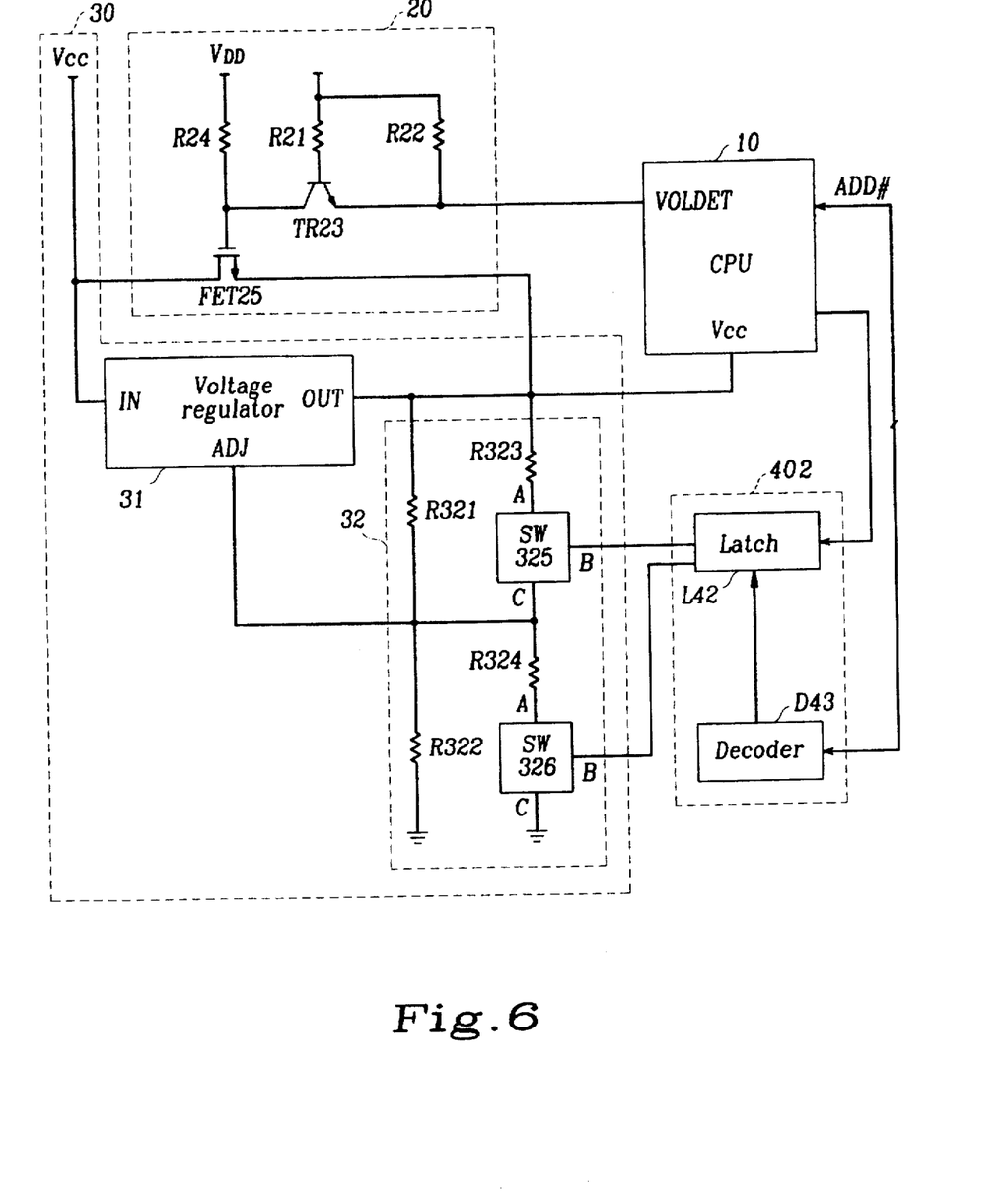
FIG. 6 is a block diagram of still another power supply for automatically supplying a proper voltage to central processing unit constructed in accordance with the principles of the present invention.

Third, the operation of controller of a power supply for automatically supplying a proper voltage to a central processing unit (CPU) as shown in FIG. 6 is as follows. When the voltage detecting pin VOLDET state is in a high-state, the operation is the same as the above mentioned second operation state. When the voltage detecting pin VOLDET state is in a low-state, the operation is as follows. If the voltage detecting pin VOLDET state of the central processing unit 10 is in a low-state, the first transistor TR23 of the selection means 20 is in an on-state (S72). When the first transistor TR23 is in an on-state, the gate of the field effect transistor FET25 is in an off-state. Then, the voltage $V_{CC}$ is in an off-state. Then, the voltage $V_{CC}$ is not supplied to the drain is not supplied to the central processing unit 10 through the source. The voltage regulator 31 receiving the voltage $V_{CC}$ through the input port IN outputs the second voltage determined from the fourth and the fifth resistors R321 and R322 by an initial state of an off-state of the first and the second switches SW325 and SW326 (S74).

Hereafter, the computer system determines the type of the central processing unit 10, executing a self-test procedure when turning the power on (S75). If the type of the central processing unit 10 is the one requiring the initial setting output voltage, the second voltage is continuously supplied (S79). However, if a central processing unit 10 having another operating voltage is mounted, the data of the type of the central processing unit 10 is outputted to a latch L42 of a controller 402.

At this time, the central processing unit 10 outputs an address signal ADD# to a decoder D43 for driving the latch L42. The decoder D43 decodes address signal ADD# and outputs a latch selecting signal to the latch L42.

The latch L42 is to be enabled by the latch selecting signal and outputs the data signal of the type of the central processing unit 10 to the voltage division means 32 (S76–S77). The switch receiving the signal outputted from the latch L42 between the first and the second switches SW325 and SW326 is in an on-state. If the first switch SW325 is in an on-state, the sixth resistor R323 connected to the first port A is connected to the fourth resistor R321 in parallel, and if the second switch SW326 is in an on-state, the seventh resistor R324 connected to the first port A is connected to the fifth resistor R322 in parallel. So, the second voltage outputted from the voltage regulator 31 is converted and is output. Since the sixth and the seventh resistor R323 and R324 are set so that the converted output voltage fits the type of the central processing unit 10, the power supply 30 supplies the operating voltage to fit the type of the central processing unit 10.

Therefore, the cost of the present invention may be reduced because a voltage regulator module is not used, and the user need not select the operating voltage of the central processing unit. In addition, an error is not produced nor is the central processing unit damaged.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A power supply for automatically supplying a proper voltage to a central processing unit, the central processing unit performing data processing and controlling input and output functions, the power supply comprising:

a power supply generator for supplying power to the central processing unit; and a controller for determining a type of the central processing unit and for outputting a control signal to the power supply generator so as to supply a proper operating voltage to the central processing unit in response to determining the type of the central processing unit.

2. A power supply for automatically supplying a proper voltage to a central processing unit, comprising:

a voltage detecting pin, included in the central processing unit, for outputting an operating voltage indicating signal;

a selection means for sensing the operating voltage indicating signal and for causing an operating voltage to be input to the central processing unit in response thereto;

a power supply generator for supplying power to the central processing unit; and a controller for determining a type of the central processing unit and for outputting a control signal to the power supply generator so as to supply a proper operating voltage to the central processing unit in response to determining the type of the central processing unit.

3. The device as claimed in claim 2, wherein said selection means comprises:

a first switching means having an operating state which changes according to an output state of the voltage detecting pin of the central processing unit;

a first resistor having one terminal which is connected to the power supply generator and another terminal connected to said first switching means; and a second switching means having an operating state which changes according to an operating state of said first switching means, and which controls an operating state of said power supply generator.

4. The device as claimed in claim 1, wherein said power supply generator comprises:

a voltage regulator which maintains a constant output voltage regardless of the change of an input and output load; and a voltage division means which divides an output voltage of said voltage regulator so as to adjust to the proper operating voltage of the central processing unit.

5. The device as claimed in claim 4, wherein said voltage division means comprises:

a second resistor having one terminal which is connected to an output port of the voltage regulator and another terminal connected to an adjusting port of the voltage regulator;

a third resistor having one terminal which is connected to said second resistor and another terminal which is grounded;

a fourth resistor having one terminal which is connected to the output port of said voltage regulator;

a first switch having a first port which is connected to another terminal of said fourth resistor, a second port which is connected to the controller, and a third port which is connected to the third resistor;

a fifth resistor having one terminal which is connected to the third port of said first switch; and a second switch having a first port which is connected to another terminal of said fifth resistor, a second port which is connected to the controller, and a third port which is grounded.

6. The device as claimed in claim 5, wherein said first switch comprises a relay.

7. The device as claimed in claim 5, wherein said second switch comprises a relay.

8. The device as claimed in claim 5, wherein said first switch comprises an analog switch.

9. The device as claimed in claim 5, wherein said second switch comprises an analog switch.

10. The device as claimed in claim 5, wherein said first switch comprises a transistor.

11. The device as claimed in claim 5, wherein said second switch comprises a transistor.

12. The device as claimed in claim 1, wherein said controller comprises a keyboard controller which outputs a corresponding signal to said power supply generator by distinguishing the operating voltage of the central processing unit.

13. The device as claimed in claim 1, wherein said controller comprises:
- a latch for outputting each data signal from the central processing unit to said power supply generator; and
- a decoder for outputting a signal for driving said latch after decoding an address signal from the central processing unit.

14. A method for automatically supplying a proper voltage to a central processing unit, comprising the steps of:
- detecting a voltage detecting pin state of a voltage detecting pin of the central processing unit;
- supplying a first voltage to the central processing unit if the detected voltage detecting pin state of the voltage detecting pin of the central processing unit is in a high-state after turning on a computer system containing the central processing unit;
- supplying a second voltage and determining the type of the central processing unit if the detected voltage detecting pin state of the central processing unit is in a low state; and
- supplying a proper operating voltage to the central processing unit according to the determined type of central processing unit.

15. The method as claimed in claim 14, wherein the step of supplying a proper operating voltage to the central processing unit according to the determined type of the central processing unit comprises:
- outputting a high signal to an output port B of a keyboard controller by using an operating voltage as a third voltage;
- supplying the third voltage upon receiving the signal of the output port B;
- supplying a second voltage by using the operating voltage as the second voltage;
- outputting a high signal to an output port A of the keyboard controller by using an operating voltage as a fourth voltage; and
- supplying the fourth voltage upon receiving the signal of the output port A.

16. A power supply for automatically supplying a proper voltage to a central processing unit, the central processing unit performing data processing and controlling input and output functions, the power supply comprising:
- a power supply generator for supplying power to the central processing unit; and
- a controller for outputting a control signal to the power supply generator so as to supply a proper operating voltage to the central processing unit upon determining a type of the central processing unit;

said power supply generator comprising:
- a voltage regulator which maintains a constant output voltage regardless of the change of an input and output load; and
- a voltage division means which divides an output voltage of said voltage regulator so as to adjust to the proper operating voltage of the central processing unit; said voltage division means comprising:
  - a first resistor having one terminal which is connected to an output port of the voltage regulator and another terminal connected to an adjusting port of the voltage regulator;
  - a second resistor having one terminal which is connected to said first resistor and another terminal which is grounded;
  - a third resistor having one terminal which is connected to the output port of said voltage regulator;
  - a first switch having a first port which is connected to another terminal of said third resistor, a second port which is connected to the controller, and a third port which is connected to the second resistor;
  - a fourth resistor having one terminal which is connected to the third port of said first switch; and
  - a second switch having a first port which is connected to another terminal of said fourth resistor, a second port which is connected to the controller, and a third port which is grounded.

17. The device as claimed in claim 16, wherein said first switch comprises a relay.

18. The device as claimed in claim 16, wherein said second switch comprises a relay.

19. The device as claimed in claim 16, wherein said first switch comprises an analog switch.

20. The device as claimed in claim 16, wherein said second switch comprises an analog switch.

21. The device as claimed in claim 16, wherein said first switch comprises a transistor.

22. The device as claimed in claim 16, wherein said second switch comprises a transistor.

23. A power supply for automatically supplying a proper voltage to a central processing unit, the central processing unit performing data processing and controlling input and output functions, the power supply comprising:
- a power supply generator for supplying power to the central processing unit; and
- a controller for outputting a control signal to the power supply generator so as to supply a proper operating voltage to the central processing unit upon determining a type of the central processing unit; said controller comprising a keyboard controller which outputs a corresponding signal to said power supply generator by distinguishing the operating voltage of the central processing unit.

24. A power supply for automatically supplying a proper voltage to a central processing unit, the central processing unit performing data processing and controlling input and output functions, the power supply comprising:
- a power supply generator for supplying power to the central processing unit; and
- a controller for outputting a control signal to the power supply generator so as to supply a proper operating voltage to the central processing unit upon determining a type of the central processing unit; said controller comprising:
  - a latch for outputting each data signal from the central processing unit to said power supply generator; and a decoder for outputting a signal for driving said latch after decoding an address signal from the central processing unit.

25. A power supply for automatically supplying a proper voltage to a central processing unit, comprising:
- a voltage detecting pin, included in the central processing unit, for outputting an operating voltage indicating signal;
- a selection means for causing an operating voltage to be input to the central processing unit by sensing the voltage detecting pin state;
- a power supply generator for supplying power to the central processing unit; and
- a controller for outputting a control signal to the power supply generator so as to supply a proper operating voltage to the central processing unit upon determining a type of the central processing unit;

said selection means comprising:
- a first switching means having an operating state which changes according to an output state of the voltage detecting pin of the central processing unit;
- a first resistor having one terminal which is connected to the power supply generator and another terminal connected to said first switching means; and
- a second switching means having an operating state which changes according to an operating state of said first switching means, and which controls an operating state of said power supply generator.

26. A method for automatically supplying a proper voltage to a central processing unit, comprising the steps of:

supplying a first voltage to the central processing unit in a detected voltage detecting pin state of a voltage detecting pin of the central processing unit is in a high-state after turning a computer system containing the central processing unit on;

supplying a second voltage and determining the type of the central processing unit when a detected voltage detecting pin state is in a low state; and supplying a proper operating voltage to the central processing unit according to the determined type of the central processing unit; the step of supplying a proper operating voltage to the central processing unit according to the determined type of the central processing unit comprising:
- outputting a high signal to an output port B of a keyboard controller by using an operating voltage as a third voltage;
- supplying the third voltage upon receiving the signal of the output port B;
- supplying a second voltage by using the operating voltage as the second voltage;
- outputting a high signal to an output port A of the keyboard controller by using an operating voltage as a fourth voltage; and
- supplying the fourth voltage upon receiving the signal of the output port A.

* * * * *